(12) United States Patent
Schuh

(10) Patent No.: US 6,850,859 B1
(45) Date of Patent: Feb. 1, 2005

(54) SENSOR DRIFT COMPENSATION BY LOT

(75) Inventor: William C. Schuh, Delavan, WI (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 0 days.

(21) Appl. No.: 10/726,991

(22) Filed: Dec. 3, 2003

(51) Int. Cl.⁷ .............................................. G01D 18/00
(52) U.S. Cl. ........................... 702/104; 702/85; 702/99; 702/93; 324/225; 324/105; 374/1
(58) Field of Search ............................ 702/104, 99, 85, 702/91, 93, 130; 324/105, 225, 720; 374/1, 169

(56) References Cited

U.S. PATENT DOCUMENTS

| | | | |
|---|---|---|---|
| 4,218,916 A | | 8/1980 | Mutziger |
| 4,242,907 A | | 1/1981 | Kazmierowicz |
| 4,660,993 A | | 4/1987 | Benedek |
| 4,721,942 A | | 1/1988 | Benedek et al. |
| 4,826,738 A | | 5/1989 | Smeggil |
| 4,834,807 A | | 5/1989 | Burley |
| 5,043,023 A | | 8/1991 | Bentley |
| 5,071,258 A | | 12/1991 | Usher et al. |
| 5,275,670 A | | 1/1994 | Smialek et al. |
| 5,645,077 A | * | 7/1997 | Foxlin ........................ 600/587 |
| 5,675,118 A | | 10/1997 | Kortvelyessy |
| 6,038,021 A | * | 3/2000 | Piso et al. ............... 356/238.2 |
| 6,300,554 B1 | | 10/2001 | Du et al. |
| 6,304,827 B1 | * | 10/2001 | Blixhavn et al. ........... 702/104 |
| 6,363,330 B1 | | 3/2002 | Alag et al. |
| 6,473,708 B1 | | 10/2002 | Watkins et al. |
| 6,486,661 B2 | * | 11/2002 | Chia et al. ................. 324/225 |
| 2003/0028345 A1 | | 2/2003 | Watkins et al. |

* cited by examiner

Primary Examiner—John Barlow
Assistant Examiner—Hien Vo
(74) Attorney, Agent, or Firm—Harness, Dickey & Pierce, P.L.C.

(57) ABSTRACT

Drift compensation systems and methods are presented for compensating the drift of a sensor within a manufacturing lot. The system comprises a sensor test sample manufactured from a lot of material having substantially similar chemical or metallurgical properties, a drift characterization tester, wherein the test sample is exposed to a predetermined thermal environment. Measurements of the test sample output are analyzed to provide a drift function describing the relationship between time and temperature from the thermal exposure measurements of the test sample in the drift characterization tester. Parameters associated with the drift function and the sensor test sample are stored in a memory storage component associated with a second sensor. The second sensor is manufactured from the same lot of material as the sensor test sample. A sensor system is manufactured comprising the second sensor and the memory storage component. A drift compensation instrument coupleable to the second sensor and the memory storage component of the sensor system is operable to retrieve the stored parameters of the drift function from the memory storage component and correct the output of the second sensor based on the drift function, thereby compensating the output drift of the sensors manufactured from the same lot of material.

30 Claims, 10 Drawing Sheets

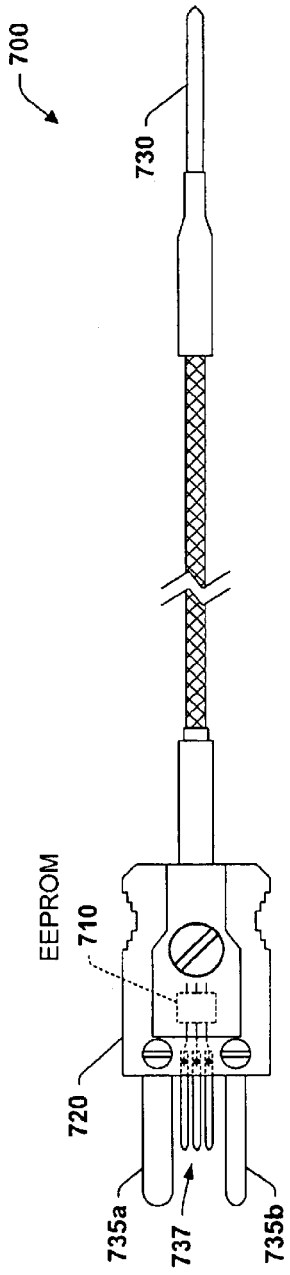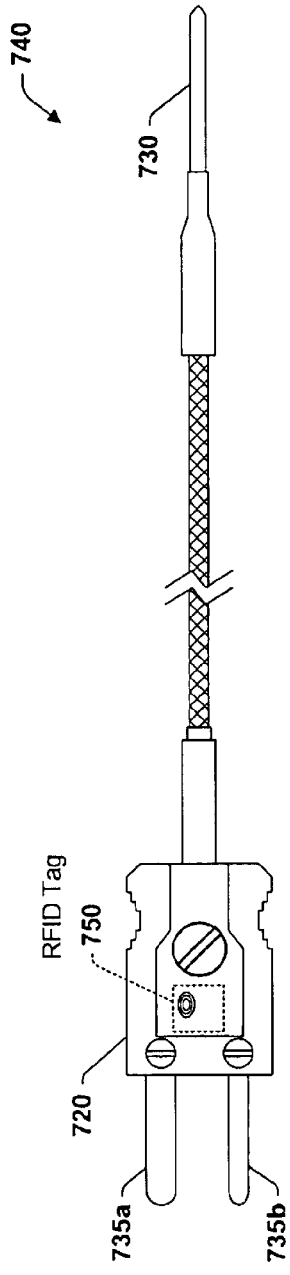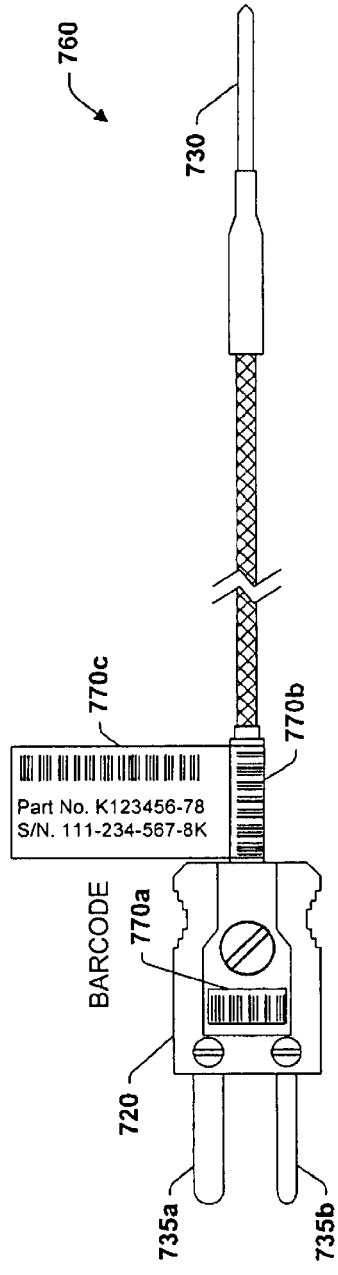

*1000*

Fitted Data Coefficients

| Coefficient | Segment T1 | Segment T2 | Segment T3 |
|---|---|---|---|
| C2 | 0.000125 | 6.01E-05 | -2.88E-05 |
| C1 | -0.104619 | -0.083204 | 0.004296 |
| C0 | 0.077962 | -1.440902 | -22.69574 |
| $t_{LOW}$ | 0 | 240 | 500 |
| $t_{HIGH}$ | 240 | 500 | 720 |

*1010*

$DRIFT = C2 (t^2) + C1 (t) + C0$
(Over Time segment: $t_{LOW}$ to $t_{HIGH}$)

2D Data for Storage

| Time (hrs) | Drift (°C) |
|---|---|
| 0 | 0 |
| 24 | -2.07 |
| 48 | -4.95 |
| 72 | -6.72 |
| 96 | -8.86 |
| 168 | -14.02 |
| 192 | -15.29 |
| 240 | -17.91 |
| 336 | -22.16 |
| 360 | -23.82 |
| 408 | -25.66 |
| 528 | -28.54 |
| 552 | -29.30 |
| 672 | -32.28 |
| 720 | -34.86 |

FIG. 9

SENSOR DRIFT COMPENSATION BY LOT

FIELD OF INVENTION

The present invention relates generally to sensors and more particularly to systems and methods for compensating the drift of a thermocouple and other such sensors within a manufactured lot by test characterizing a sensor test sample from the lot.

BACKGROUND OF THE INVENTION

Many sensors output a signal in response to a given environmental condition. For instance a thermocouple has a voltage output due to a temperature difference from one end to the other end of the sensor. Thermocouples are analog temperature sensors that utilize the thermoelectric properties of two dissimilar materials, typically metals, to generate an EMF in proportion to a temperature gradient across a material inhomogeneity. Common thermocouples used in temperature measurement comprise two metal wires of different thermoelectric properties called thermoelements connected at one end to form a "hot junction" also known as a "measuring junction". The other ends of the wires are connected to instrumentation such as a voltmeter to measure the EMF produced by the thermocouple. The wires are connected to the instrumentation at a known reference temperature to form a "reference junction" or a "cold junction".

Thermocouples and other such sensors follow a nominal response curve to allow the user to quantify the measured parameter based on the output of the sensor. Most of the sensors will have a shift in output over time from an initial response curve. This irreversible change may be due to chemical or metallurgical changes in materials used to construct the transducer. This shift in the output of the sensor is commonly referred to as drift. Since it is desirable to make as accurate a measurement as is feasible it would be advantageous to the user of the sensor if the drift could be eliminated. In many instances it is not easy to eliminate drift.

Sensor drift can be caused by many different mechanisms but two prime sources of drift are chemical or metallurgical changes. For instance a common drift mechanism in type K thermocouples, where the chromium preferentially oxidizes, is a phenomenon called "green rot". By chemically binding some of the chrome in an oxide the percent composition of chrome in the alloy is essentially reduced causing a shift in the thermoelectric output of the sensor. Green rot has been found to be difficult to prevent from occurring.

Not all sources of drift are due to chemical or metallurgical changes. For instance a sensor may become mechanically damaged causing a shorted condition leading to a false reading or a sensor may become water soaked leading to electrical shunting and apparent drift. Such occurrences may not be correctable and are difficult to predict or reproduce in a lab environment. While these other sources of drift are no less important in attaining accurate measurements it is still desirable to correct for as many sources of drift as possible. In addition, the level of drift may vary greatly between manufactured lots of sensors due to variations in the chemical and/or metallurgical properties of the materials used in the sensors. There are also sources of drift that are temporary and reversible such as the temperature effects on a pressure sensor. Thus, drift may be thought of as having two basic origins: drift produced by reversible effects such as those due to ambient temperature, and drift caused by irreversible changes due to fundamental alterations in the chemical or metallurgical properties of the transducer.

Accordingly, there is a need for compensating for sources of drift that may be predicted and reproduced in the lab for thermocouple systems and other such sensor systems while mitigating variations in the sensor output due to drift between material lots used in the manufacturing of the sensors.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention is directed to a sensor system for compensating for sources of drift that may be predicted and reproduced in the lab using sensors manufactured from a characterized material lot, thereby minimizing variations in the output of the system between lots due to drift. A lot of materials would be a grouping of materials that could be expected to have measurably similar material characteristics or properties because of some shared production processes. The present invention further accommodates application variability by optionally allowing an input means for the particular time and/or temperature conditions of a customers' application and the corrections thereof due to drift.

The output of many sensors (e.g., thermocouples, RTDs, pressure sensors, humidity sensors, chemical sensors, flow sensors) may drift as a function of temperature and time, particularly when exposed to extreme high or low temperatures, resulting in a fundamental alteration in the chemical or metallurgical properties of the materials used to construct the sensors. The inventor of the present sensor compensation system has realized that sensors of the same metallurgical and chemical construction will react to environmental conditions in a like manner.

Therefore, the drift compensation of the present invention meets this need in thermocouple systems and other such sensor systems by providing a method for characterizing one or more test samples of the sensor manufactured from a specific lot of material with respect to an expected time and temperature profile. The drift of the test sensor is determined and may be represented as a shift of the sensors' output as a function of time and temperature. Parameters of the drift function may then be used by a drift compensating instrument to compensate the output of another such sensor from the same manufacturing lot with respect to time and/or temperature due to drift.

The temperature measurement output of conventional thermocouple systems, for example, may drift by up to 30° C. or more after prolonged exposure at high temperatures. This drift in the output of the thermocouple system instrumentation may not be an acceptable error, particularly when this system change is usually irreversible. In some conventional sensor systems, this problem may be partially mitigated by frequent recalibration or replacement of the sensors used. This procedure is expensive, time consuming, and still may not account for the change in the sensors' drift between calibration periods.

The drift compensation system of the present invention comprises a drift characterization tester for characterizing a sensor test sample manufactured from a particular material lot, the tester providing parameters (e.g., coefficients of a fitted drift function, multiple sets of coefficients, a two dimensional matrix of time-temperature data) associated with the drift of the test sample. The system further includes a sensor system having a second sensor made from the same material lot and a memory storage component (e.g., an EEPROM, an EPROM or another such memory device, a computer disc or another such computer readable medium, a memory storage location, a barcode, an RFID tag, a virtual memory storage location on a network) for storing the parameters. The system also has a drift compensation instrument (e.g., a computerized temperature, pressure, flow, or chemical measuring instrument) coupleable to the sensor system and operable to use the parameters stored in the memory storage component to compensate the drift of the output of the second sensor with respect to time and/or temperature.

In one aspect of the drift compensation system, the sensor type is a temperature sensor such as a thermocouple, an RTD, a pressure sensor, a humidity sensor, a chemical sensor, and a flow sensor.

In another aspect of the invention the memory storage component is an EEPROM, an EPROM or another such memory device, a computer disc or another such computer readable medium, a memory storage location, a barcode, an RFID tag, a virtual memory storage location on a network for storing the parameters.

In still another aspect of the invention the drift compensation instrument includes a microprocessor, an analog to digital converter, and a memory.

In yet another aspect of the invention the sensor system may comprise a memory storage device associated with the test sample and the second sensor.

In another aspect of the invention the drift characterization tester may comprise a thermal test chamber for testing and characterizing the sensor test sample as a function of temperature and time.

In still another aspect of the present invention the drift characterization tester comprises a drift analyzer for determining a drift function of the sensor test sample as a function of temperature and time, for determining one or more sets of parameters associated with the drift, and operable to store the parameters in a memory associated with the tester or a second sensor.

To the accomplishment of the foregoing and related ends, the following description and annexed drawings set forth in detail certain illustrative aspects and implementations of the invention. These are indicative of but a few of the various ways in which the principles of the invention may be employed. Other aspects, advantages and novel features of the invention will become apparent from the following detailed description of the invention when considered in conjunction with the drawings.

BRIEF DESCRIPTION OF THE DRAWINGS

FIG. 7A-C are diagrams of several exemplary thermocouple sensor systems illustrating various memory storage components and methods for storing parameters associated with the drift of a thermocouple for compensating the drift of a temperature monitoring system in accordance with the present invention;

FIG. 9 is a spread sheet of an exemplary two dimensional table of thermocouple measurement data as a function of time and drift at a predetermined temperature such as may be stored and used in a TC drift compensation system in accordance with an aspect of the present invention;

FIG. 10 is a spread sheet of exemplary parameters associated with a drift function, the parameters comprising fitted data coefficients of thermocouple measurement data as a function of time and drift at a predetermined temperature, and such as may be stored and used in a TC drift compensation system in accordance with an aspect of the present invention.

DETAILED DESCRIPTION OF THE INVENTION

Figure 1:
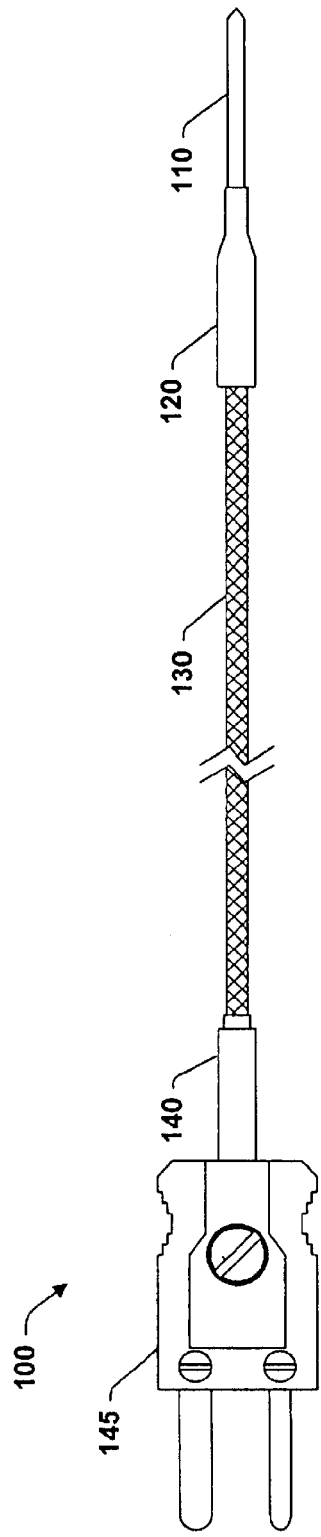
FIG. 1 is a prior art diagram illustrating a conventional thermocouple device as provided by a thermocouple manufacturer such as may be used in a temperature monitoring system.

The present invention will now be described with reference to the attached drawings, wherein like reference numerals are used to refer to like elements throughout. The invention relates to a sensor compensation system for compensation of the drift in the output of a sensor measurement system. The invention characterizes the drift of a test sensor within a lot of material used in the manufacture of a plurality of sensors, then, uses stored parameters associated with the drift of the test sensor to compensate the drift in the output of the other sensors of the same material lot.

Since sensors manufactured from one lot of material will have similar chemical and metallurgical properties it is reasonable to assume that a sample from one lot of material will behave under stress in the same manner as other sensors from this same lot. In the previously mentioned green rot example, a batch of sensors made from wire with a 10% chrome composition might have the effective chrome content reduced to 9.7% by preferential oxidation. Since all the sensors from this batch would experience approximately the same reduction in chrome content when exposed to the same environment, it is reasonable to expect the drift of any sample would be indicative of the expected drift in all the sensors.

A drift compensation means can then be realized by testing samples of sensors manufactured from a lot of material to characterize the drift of the sample sensors under specified conditions. In a temperature sensor the specified conditions might be time at temperature. The drift characterization would then be the change in output as a function of time at the specified temperatures. The drift characterization can be recorded in any of several means such as a two dimensional table of drift versus time, a mathematical function of drift as a function of time, or other parameters such fitted data coefficients of the mathematical drift function. This characterization information may then accompany all the sensors manufactured from the tested material lot or batch, permitting the information to then be used in the application to compensate for sensor drift using lot characterization. The drift characterization could be cumulative to account for different drift rates corresponding to different application conditions.

While it is easiest to implement a drift characterization means when the characterizing parameters are the same as the sensor's measured parameter it is also possible to use alternate parameters to compensate for drift. For instance a pressure sensor may have a shift in output when exposed to high or low pressures and so that may constitute one correction mechanism. But the same sensor may also experience drift when exposed to high or low temperatures. In this case a separate sensor is conventionally required to measure any parameters not already measured by the primary sensor. For the pressure sensor example, the primary sensor is the pressure sensor but this would require a secondary temperature sensor to compensate for temperature induced drift. This temperature compensation is not to correct for reversible temperature effects due to ambient temperature but to rather correct for irreversible changes due to fundamental alterations in the chemical or metallurgical properties of the transducer.

By contrast to a conventional system, the invention described herein is a method and system for correcting irreversible drift in sensor transducers due to temperature exposure. The system comprises a plurality of sensors manufactured from the same lot of material having substantially similar chemical or metallurgical properties. The system also comprises a drift characterization tester for exposing a sensor test sample to a predetermined thermal environment (e.g., a predetermined temperature and time) and characterizing a drift function describing the relationship between time at temperature and a corresponding drift. The system further comprises a memory storage component for storing parameters of the drift function in one of a variety of formats, a drift compensation instrument coupled to one of the plurality of sensors and the memory storage component for retrieving and utilizing the stored information to correct the drift in the sensor output.

In accordance with one aspect of the present invention, the sensor is a thermocouple temperature sensor consisting of two dissimilar metals. The sensor is manufactured from a bulk material lot having substantially similar chemical or metallurgical properties throughout, such as a coil of wire from a particular melt and process. The predetermined thermal exposure may comprise a determination of the expected temperature history through knowledge of the intended application of the sensor based on known temperatures and environments.

The characterization test is done, in accordance with an aspect of the invention, at the same application temperature in a test lab using a known good standard temperature sensor (reference sensor) and a sensor test sample from the same lot of material as the sensor to be characterized. The output of the test sensor is compared against the standard over a period of time to record the drift of the test sensor over time. This test then results in a function of drift versus time which can be characterized by a piecewise linear function with time as the independent variable and drift as the dependent variable. This data may be stored (e.g., as a two by N dimensional matrix of data) as will be discussed in association with the data table of FIG. 9. Alternately, as will be discussed further in connection with FIGS. 10–11, a piecewise continuous function of the second order may be used wherein the data may be stored in a three by N dimensional matrix of the first and second order constants (requiring three coefficients) of the line over each of N segments along with the endpoint of the segment. Regardless of the order of the multinomial used, a two dimensional matrix of this thermal history may be stored in an electrically erasable programmable read only memory (EEPROM) chip that is integral to the sensor. In one exemplary application, the temperature sensor is connected to an electronic instrument capable of retrieving the stored information from the EEPROM and using the retrieved temperature value along with an associated elapsed time from the thermal history to calculate a drift value. This calculated drift value is then used to compensate or correct the indicated temperature value with respect to drift.

In order to better appreciate one or more features of the invention, several exemplary implementations of the drift compensation systems, the sensor systems, a sensor measurement system, and a drift characterization tester are hereinafter illustrated and described with respect to the following figures. Although the drift compensation and sensor systems of the present invention will be shown and described in the examples and figures of the invention using thermocouples, RTDs, thermistors and other thermal transducers for measuring temperatures, a variety of other sensor types and measurements including pressure, flow, humidity and chemical sensors are also anticipated in the context of the present invention, wherein drift may be compensated from the sensor output.

Figure 2:
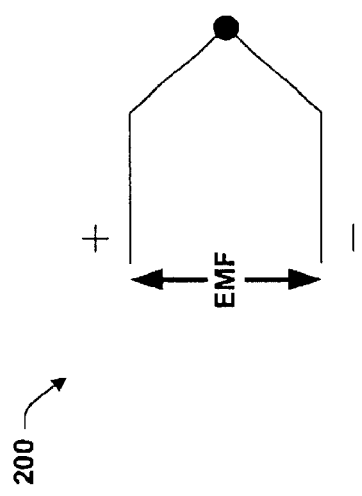
FIG. 2 is an accompanying schematic symbol of the prior art thermocouple of FIG. 1, and the polarity of an EMF provided by the device.

FIG. 1 illustrates a conventional thermocouple device 100, such as may be provided by a thermocouple manufacturer and used in a temperature monitoring system, while FIG. 2 illustrates an accompanying schematic symbol 200 of the thermocouple of FIG. 1. Most common thermocouples are temperature measuring devices or sensors comprising two dissimilar metals connected together at one end, called the hot junction. The two metals have a polarity with respect to each other and one of these is referred to as the positive leg and the other as the negative leg. The two free ends, called the cold end, generate a voltage (EMF) proportional to the temperature difference between the hot end and the cold end.

Referring back to FIG. 1, the conventional thermocouple typically has a stainless steel sheath 110 for protection over the hot junction that may be potted therein (e.g., a ceramic, or epoxy potting material), together with a transition 120 (e.g., stainless steel) to protect the transition to a length of high temperature insulated leadwire 130. The leadwire 130 may also have a length of heatshrink protection and a label 140 before it terminates in a mini-plug connector 145.

Figure 3:
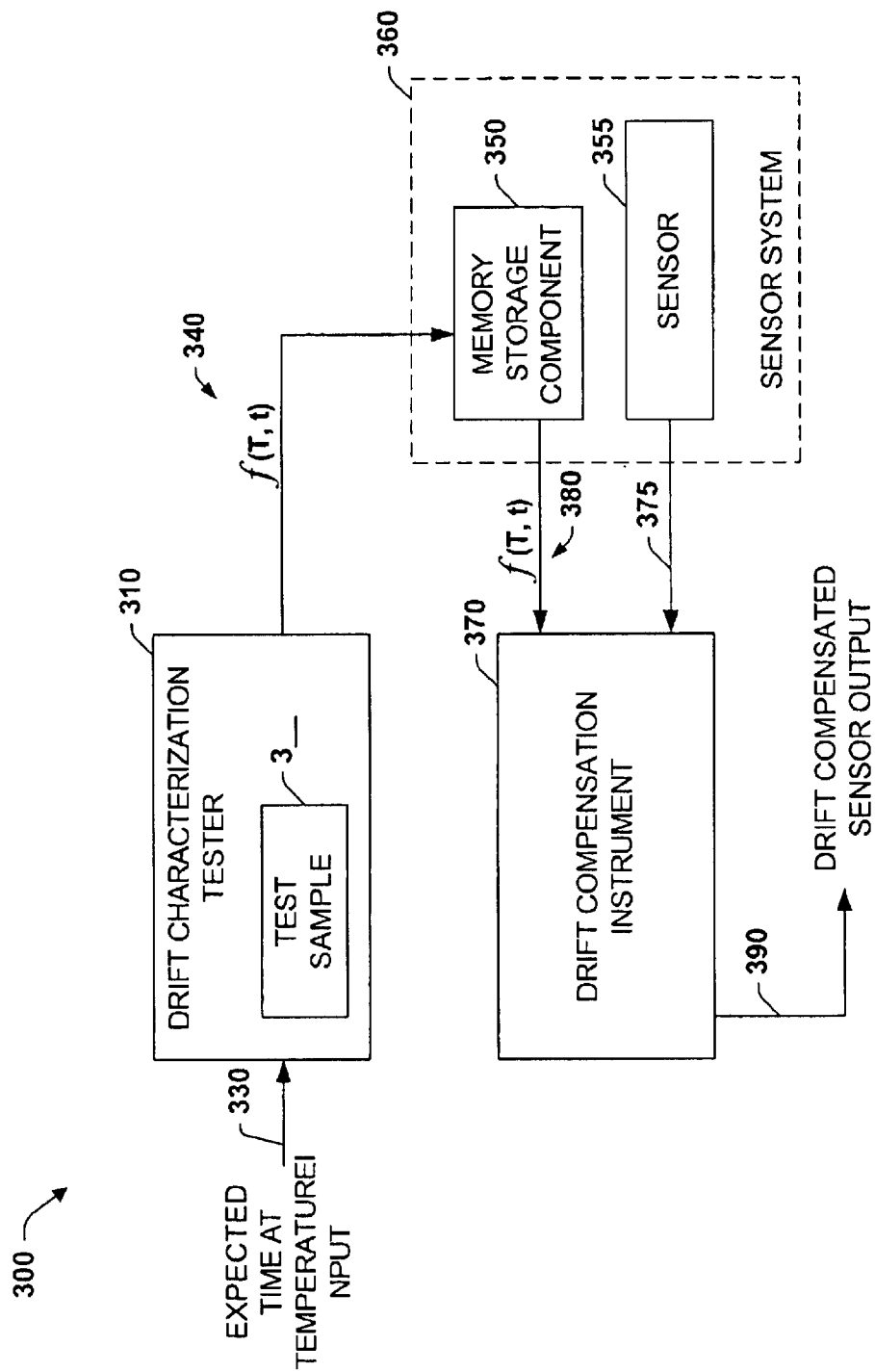
FIG. 3 is a diagram illustrating an exemplary drift compensation system for compensating for the thermal drift of a sensor in a monitoring system in accordance with the present invention.

FIG. 3 illustrates a diagram of an exemplary drift compensation system 300 for compensating for the drift of a sensor in a monitoring system in accordance with the present invention such as may be used in a variety of sensor measurement systems including a thermocouple system for temperature measurement. The drift compensation system 300 comprises a drift characterization tester 310 for testing and characterizing a sensor test sample 320. The characterization tester 310 is operable to expose the sensor to a predetermined environment such as a predetermined temperature for a predetermined time period, or a predetermined pressure for a predetermined time period. The predetermined exposure may further comprise a user or customer input expected exposure 330, such as an expected temperature and time period for a thermal sensor.

The result of the drift characterization tests on the test sample 320 would provide a drift function 340 in the units of the particular sensor type as a function of time (e.g., a function of temperature and time for a thermal sensor, or a function of pressure for a pressure sensor). The drift function 340 may be also be represented as parameters associated with the drift function or fitted data coefficients of a mathematical drift function over a defined time interval, or as multiple sets of data coefficients over multiple time intervals. The parameters associated with the drift function and the sensor test sample, are then stored in a memory storage component 350 associated with second sensor 355, the sensor 355 and memory storage component 350 comprising a sensor system 360 of the drift compensation system 300.

A drift compensation instrument 370 coupleable to the sensor system 360, measures the sensor output 375 (e.g., a current measurement of the temperature, or pressure), and retrieves parameters 380 representing the drift function 340 stored in the memory storage component 350. The drift compensation instrument 370 then uses the parameters 380 to compensate the output 375 of the second sensor 355 in accordance with the drift of the sensor 355 as a function of the exposure time and temperature 330 characterized by the sensor test sample 320.

Figure 4:
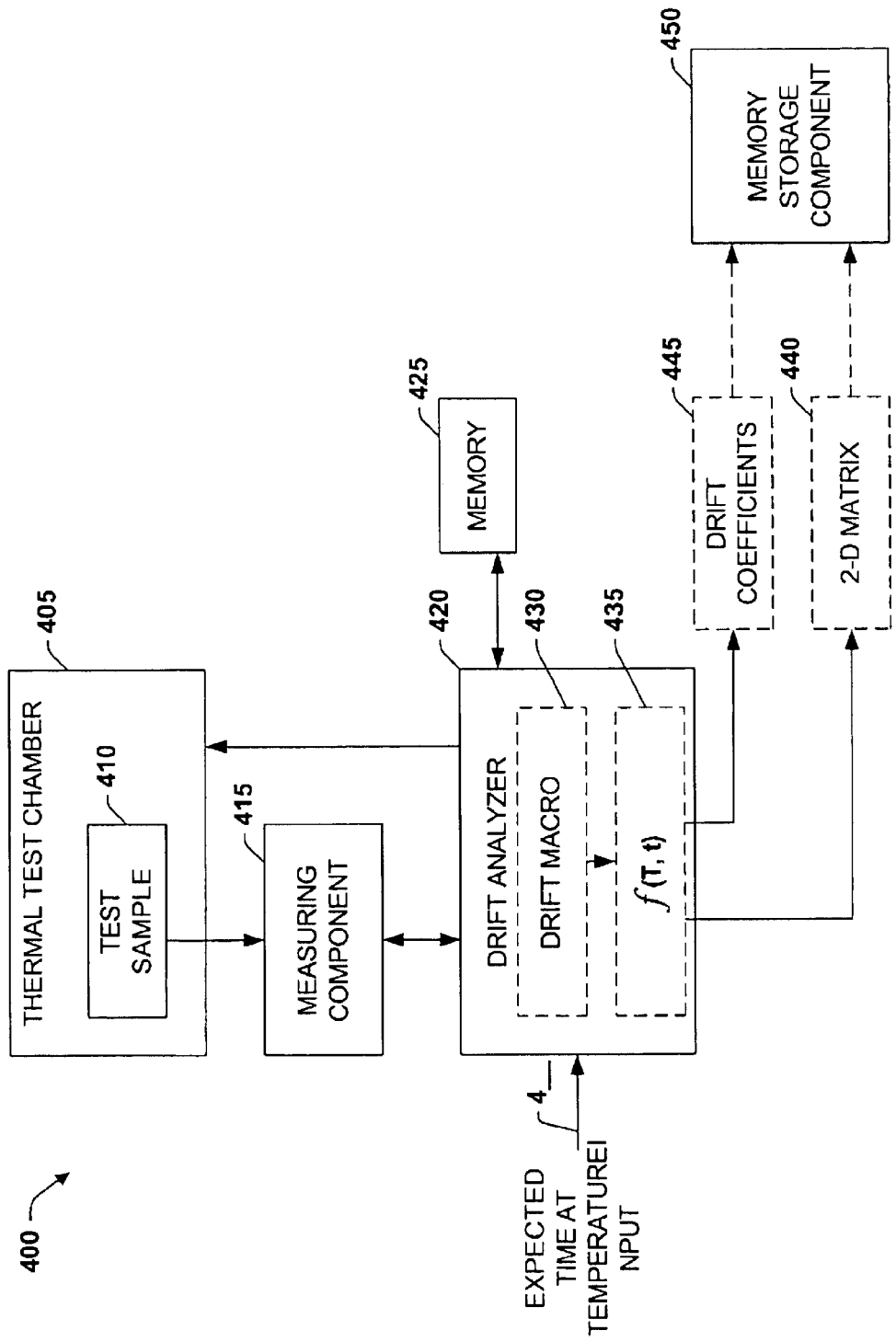
FIG. 4 is a block diagram illustrating an exemplary drift characterization tester for testing and characterizing a sensor test sample as a function of temperature and time in accordance with the present invention.

Various elements of the drift compensation system 300 may best be appreciated in the examples of the following figures. FIG. 4, for example, illustrates a block diagram of an exemplary drift characterization tester 400 similar to tester 310 of FIG. 3 in accordance with the present invention. Tester 400 of FIG. 4 permits the testing and characterizing of a sensor test sample as a function of temperature and time in the case of a thermal sensor. The tester 400 comprises a thermal test chamber 405 wherein a sensor test sample 410 is subjected to a predetermined thermal exposure of time and temperature 412 for characterization of the test sample 410. A measuring component 415 (e.g., an analog to digital converter ADC, or a digital multimeter DMM) monitors the output of the sensor test sample 410.

A drift analyzer 420 logs the measurements of the test sample 410 over time and stores this thermal history in a local memory 425. The thermal history is analyzed using a drift macro 430 within the drift analyzer 420 to define a drift function 435 of the output with respect to time. Parameters representing the drift function 435, such as a two-dimensional matrix 440 of drift data, or fitted drift coefficients 445 are then stored in a memory storage component 450 similar to the memory storage component 350 of the drift compensation system 300 of FIG. 3. Thus, the result of the drift characterization tester 400 of FIG. 4 is the derivation of a drift function 435 stored as parameters (e.g., 440, 445) in a memory 450 (e.g., an EEPROM or another such memory device or memory location, an RFID tag, a barcode, a computer readable medium) associated with both the sensor test sample 410 and a second sensor (e.g., 355 of FIG. 3) from the same material lot.

Figure 5:
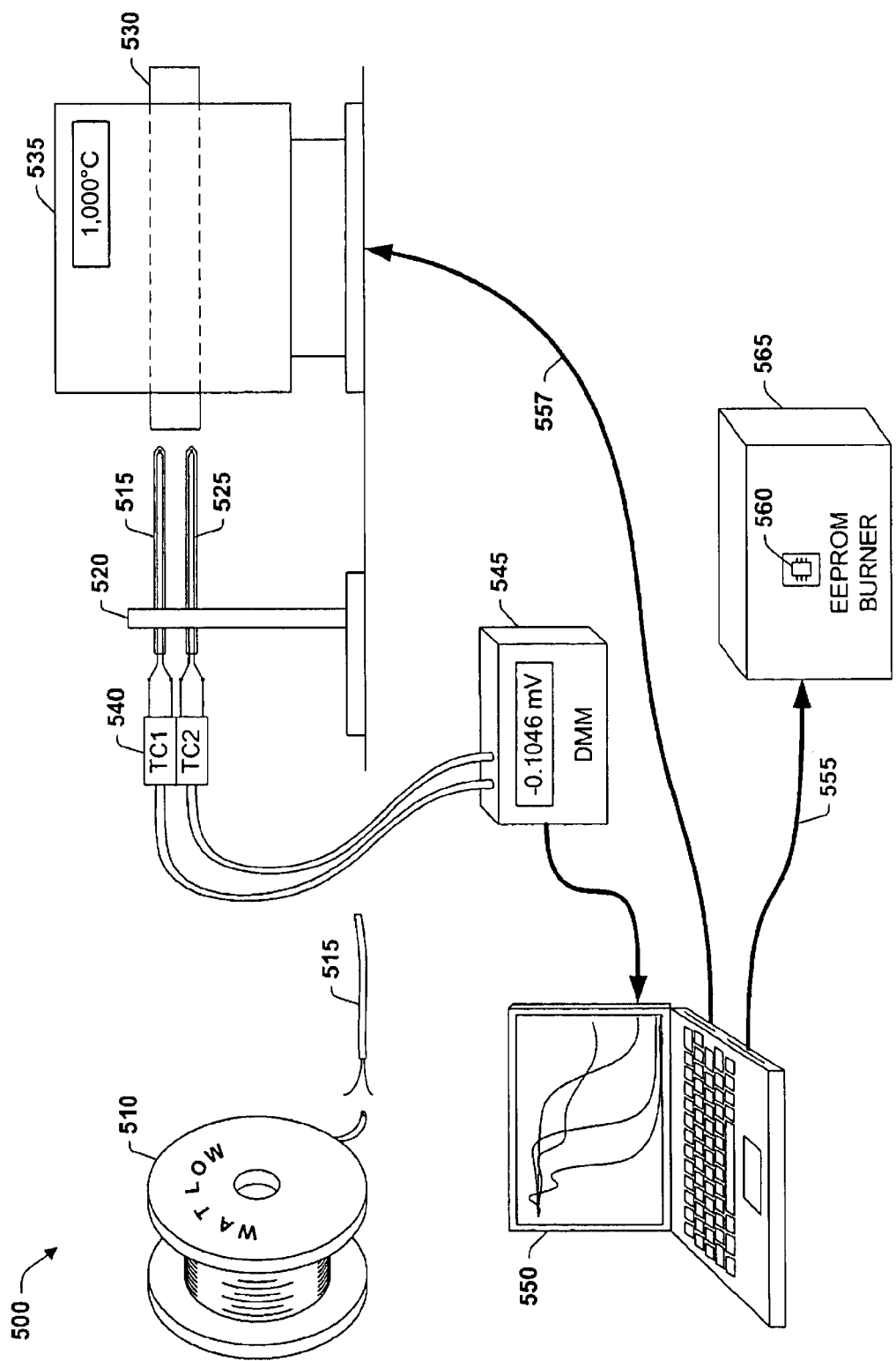
FIG. 5 is a diagram illustrating an exemplary thermocouple drift characterization tester for testing and characterizing a sensor test sample as a function of temperature and time in accordance with FIG. 4 and the present invention.

FIG. 5, for example, illustrates an exemplary thermocouple drift characterization test system 500 for testing and characterizing one or more test samples of a sensor manufactured from a specific lot of material with respect to an expected or predetermined time and temperature profile in accordance with tester 400 of FIG. 4. In the test system 500 of FIG. 5, a particular material lot is acquired having substantially or measurably the same chemical and metallurgical properties. For example, a coil of thermocouple wire 510 manufactured from a particular melt and process may serve as the material lot for the manufacture of a lot of thermocouples. A test sample 515 cut from the coil of thermocouple wire 510 provides a representative sensor sample 515 of the material lot for characterization. To insure material consistency, the inventor uses a sensor test sample 515 cut from each end of the coil 510. Then, if the samples deviate measurably in properties or the test characterization, the coil may be cut in half and new test sample ends cut and compared again.

The sensor test sample 515 is mounted on a test stand 520 along with a known reference standard such as reference thermocouple 525 for reading the true temperature in a ceramic isolation sleeve 530 within a thermal test chamber 535. The test sensor 515 together with the reference sensor 525 may be coupled via plugs and receptacles 540 to a measuring component 545 (e.g., a DMM, or ADC) into a computer 550. The computer 550 along with, for example, a software macro or specialized program, and the computers' memory is used to store the thermal history of the test sample(s) with respect to time and temperature, and to develop a drift function or parameters 555 (e.g., fitted drift data coefficients) associated with the drift function of the test sample. The thermal test chamber 535 may also receive temperature control 557 from the computer 550 for accurate regulation of the temperature in the thermal test chamber 535. The drift parameters 555 are then stored or programmed into a memory storage component 560 (e.g., an EEPROM, EPROM, memory device, memory location on a network, an RFID tag, or a barcode) using, for example, an EEPROM programmer or burner 565.

Thus, as previously discussed, the memory 560 therefore stores parameters 555 representing a characterization of the drift function associated with both the sensor test sample 515 and a plurality of other thermocouple sensors manufactured from the same material lot 510.

Figure 6:
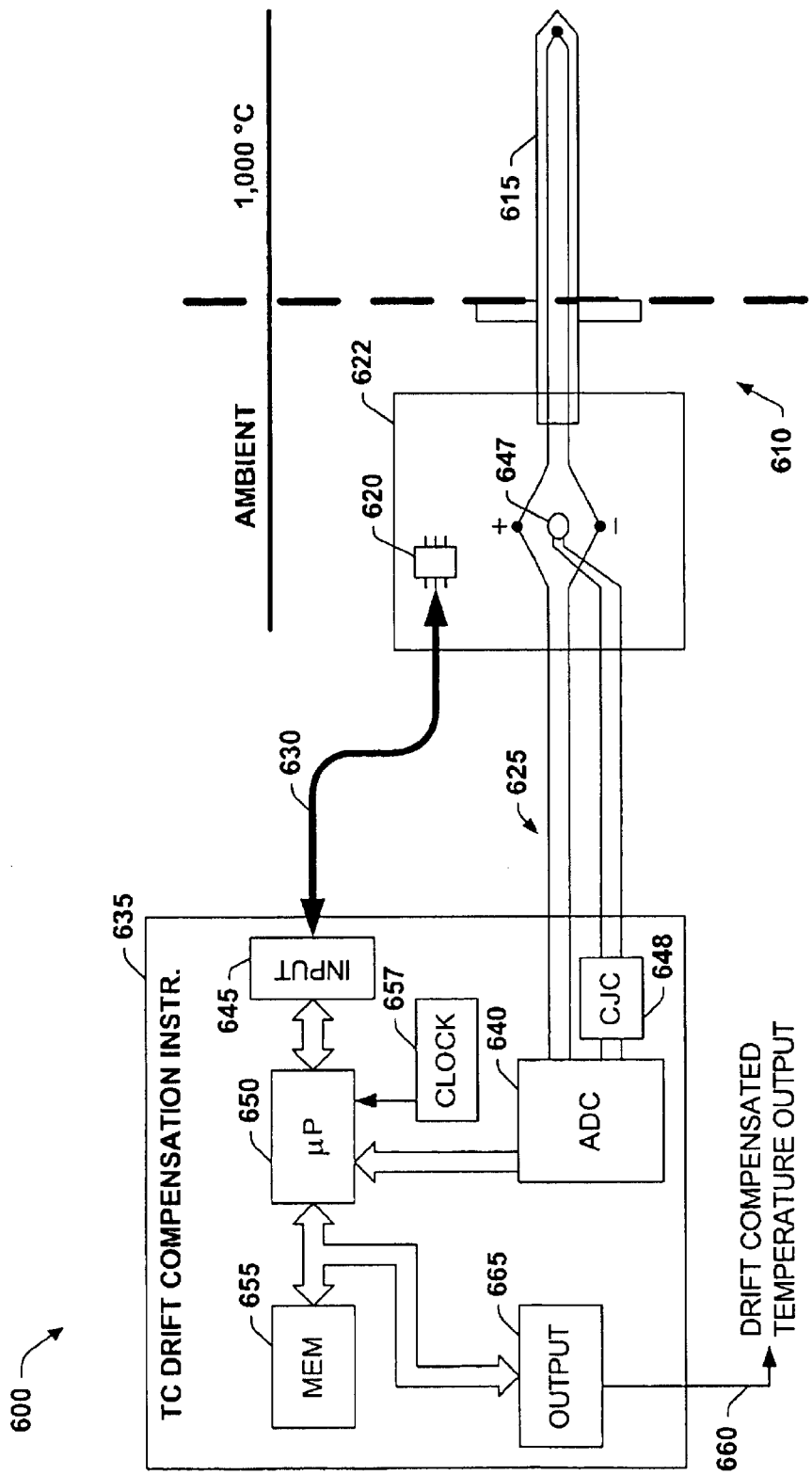
FIG. 6 is a simplified diagram illustrating an exemplary temperature measurement and drift compensation system for measuring and compensating the output of a TC sensor system having a thermocouple and an associated memory storage device in accordance with the present invention.

For example, FIG. 6 illustrates an exemplary temperature measurement and drift compensation system 600 for measuring and compensating the output of a TC sensor system having a thermocouple and an associated memory storage device in accordance with the present invention. A sensor system 610 comprises a TC sensor 615 and an associated memory storage component 620 (e.g., an EEPROM) housed together in a connector housing 622, the sensor 615 and memory 620 linked by way of a specific material lot and derived drift function parameters stored in the memory 620. Thermocouple sensor 615 provides an analog output 625, while a digital output 630 is provided by the EEPROM memory 620, together coupled to a thermocouple drift compensation instrument 635. The sensor analog output 625 of the thermocouple 615 temperature measurement, is coupled to an analog to digital converter ADC 640 of the TC drift compensation instrument 635 for conversion to a digital word, while the digital output 630 of the memory 620 is input to the instrument 635 via a digital input port 645 in one of a serial or parallel input formats.

A cold junction compensation (CJC) sensor 647, which may be located within the connector housing 622, provides a temperature measurement of the cold junction of the sensor 615. The analog output of the CJC sensor 647 is coupled back to a cold junction compensation circuit 648 that is then converted to a digital value by the ADC 640 for presentation to the microprocessor 650.

The exemplary TC drift compensation instrument 635 has a microprocessor 650 that initially (e.g., on power-up of the TC drift compensation instrument 635) retrieves the parameters from the EEPROM memory 620 and temperature measurement readings, and stores them in a local memory 655. The microprocessor 650 analyzes the temperature measurements with respect to temperature and time synchronized by a clock 657, and compensates the sensor output 625 according to the stored parameters of the memory 620 to provide a drift compensated output 660 from an output port 665 of the TC drift compensation instrument 635.

For example, the sensing portion of the TC sensor 615 may be placed in a 1,000° C. furnace while the connector portion 622 generally resides at an ambient temperature outside the furnace, thus thermally protecting the EEPROM memory 620.

FIGS. 7A–C illustrate several exemplary sensor systems (e.g., thermocouple sensor systems) utilizing various types of memory storage components for storing parameters associated with the drift of a sensor (e.g., thermocouple) in accordance with the present invention. For example, as discussed above in association with EEPROM memory storage component of FIG. 6, FIG. 7A illustrates a sensor system 700 of one such exemplary EEPROM memory storage component 710 that may be embedded within a connector housing 720 of the sensor system 700. In the present example, a thermocouple 730 may be coupled within connector housing 720 to a set of TC connector pins 735*a* and 735*b*, while the EEPROM 710 may require, for example, additional EEPROM connector pins 737 for power and memory access control. An advantage of this type memory storage component is the direct accessibility of a connected sensor monitoring system to the memory storage component 710 for immediate and remote retrieval of the stored parameters associated with the drift of the sensor 730.

FIG. 7B, illustrates another sensor system 740 having another exemplary memory storage component 750 comprising a Radio Frequency Identification (RFID) tag embedded within a connector housing 720. Again the memory storage component 750 stores the parameters associated with the drift of a sensor (e.g., thermocouple) in accordance with the present invention. An advantage of this type memory storage component is that no additional connector pins are required, the stored parameters may be read from some distance from the sensor and without direct contact to the sensor, and may possibly be read by the sensor monitoring system at short ranges for immediate and remote retrieval of the stored parameters.

FIG. 7C, illustrates yet another sensor system 760 having an exemplary memory storage component 770 comprising a barcode applied, for example, to a label 770*a* on the connector housing 720, on a shrink wrap label 770*b*, or as part of another such ID or Serial number label 770*c*. Again the memory storage component 770 stores the parameters associated with the drift of a sensor (e.g., thermocouple) in accordance with the present invention. An advantage of this type memory storage component is that no additional connector pins are required, the stored parameters may be scanned by a conventional barcode reader, and read without direct contact with the sensor for retrieval of the stored parameters for compensating the drift of a temperature monitoring system in accordance with the present invention.

Another aspect of the invention provides a methodology for compensating the drift of a thermocouple monitoring system as illustrated and described herein, as well as other types of sensor systems having sensor drift.

The method of the present invention corrects or compensates for sources of drift that may be predicted and reproduced in the lab using sensors manufactured from a characterized material lot, thereby minimizing variations in the output of the system between lots due to drift. The invention further accommodates application variability by optionally allowing an input means for the particular time and/or temperature conditions of a customers' application and the corrections thereof due to drift.

The method relies on the expectation that test samples of sensors manufactured from one material lot having similar chemical and metallurgical properties exhibit a drift indicative of all sensors in the lot. For example, in a temperature sensor, the drift may be characterized for one or more test sample sensors as a function of, for example, time and temperature. The drift characterization would then be the change in output as a function of time at a specified temperature condition. The drift characterization may be recorded or stored in a variety of formats, for example, data tables, and parameters representing the mathematical function of the drift change as a function of time, in a variety of media or devices, for example, EEPROM, RFID tags, and barcode labels comprising a memory component. A sensor system is formed when the drift characterization stored in the memory component is associated with a second sensor manufactured from the same material lot In the method of the present invention, when the second sensor is then used and monitored (e.g., in the drift compensation and measurement system of FIG. 6), the drift characterization (e.g., a set of parameters) is used to compensate the drift in the sensor measurements.

Figure 8:
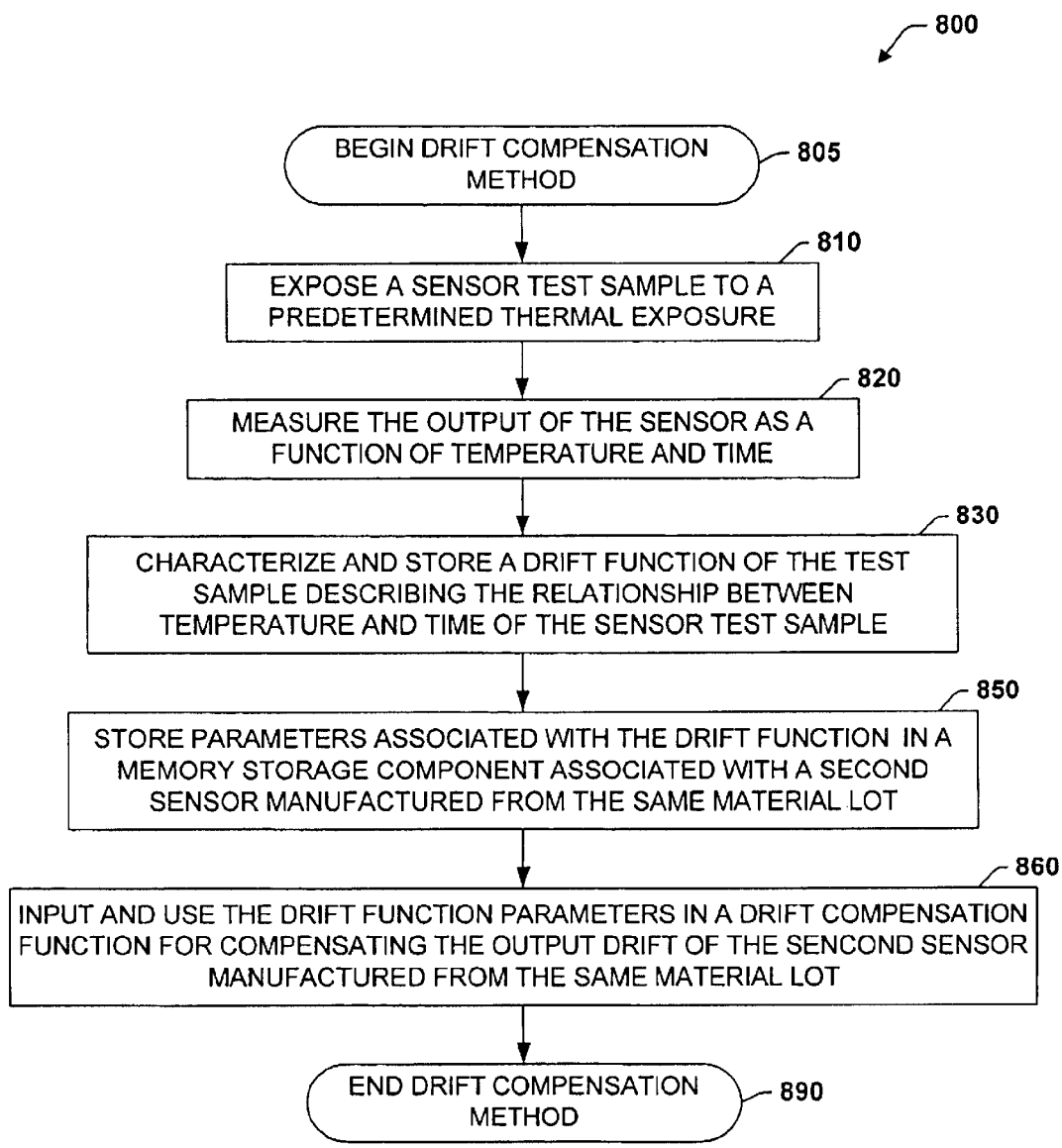
FIG. 8 is a flow chart illustrating a method of compensating for the drift in a sensor measurement system in accordance with several aspects of the present invention.

Referring now to FIG. 8, an exemplary method 800 is illustrated for characterizing a sensor test sample and for compensating for the drift in a sensor measurement system in accordance with several aspects of the present invention, for example, in a characterization tester similar to the system of FIG. 5, and a sensor measurement and compensation system similar to the system of FIG. 6. While the method 800 and other methods herein are illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the method 800 according to the present invention may be implemented in association with the compensation systems, elements, and devices illustrated and described herein as well as in association with other systems, elements, and devices not illustrated.

The exemplary drift compensation method 800 of FIG. 8 begins at 805. Initially at 810, a sensor test sample (e.g., sensor test sample 515 of FIG. 5) is exposed to a predetermined thermal environment comprising a predetermined temperature for a predetermined time in, for example, a thermal test chamber 535. At 820, the output of the sensor test sample is measured (e.g., by measuring component 545 of FIG. 5) over time and temperature as compared to a reference sensor (e.g., reference thermocouple 525 of FIG. 5), providing the sensor output as a function of, for example, time and temperature. Over the predetermined time and temperature, or for example, a series of predetermined times and temperatures, the sensor output of the sensor test sample 515 may exhibit drift characterized as the function of, for example, time and temperature at 830, and stored as a drift function of the test sample in, for example, a memory of a computer 550.

Parameters (e.g., math coefficients) associated with the drift function (or drift characterization) are then stored at 850 for future reference in a memory storage component 560 (e.g., an EEPROM 560 of FIGS. 5 and 710 of FIG. 7A, an RFID tag 750 of FIG. 7B, or a barcode 770a–c of FIG. 7C), the memory storage component (e.g., 560 of FIG. 5, or 620 of FIG. 6) associated with a second sensor (e.g., 615 of FIG. 6) manufactured from the same material lot as the test sensor 515.

When the second sensor 615 is later used in a sensor measurement system, for example, the sensor measurement and compensation system 600 of FIG. 6, the drift function parameters are input (e.g., 630 and 645 of FIG. 6) into, for example, a drift compensation instrument 635 at 860, from the memory storage component 620. The drift function parameters are used for compensating the drift in the output 625 of the second sensor 615 manufactured from the same material lot as the characterized sensor test sample 515.

Thereafter, the drift compensation method of the present invention ends at 890. Thus, the exemplary method of the present invention characterizes a drift function of a test sample sensor, stores parameters associated with the drift function in a memory storage component associated with a second sensor manufactured from the same material lot, and compensates the output drift of the second sensor using the parameters stored in the memory storage component integral to the second sensor.

FIG. 9 illustrates a spread sheet of an exemplary two dimensional table of thermal sensor measurement data 900 as a function of time and drift at a predetermined temperature, such as may be produced by the thermocouple drift characterization tester of FIG. 5. Generally, it may be observed that the drift, or change in the indicated temperature of the sensor will increase in magnitude as the exposure time increases at a predetermined application temperature. The 2D array of data 900, for example, may be stored in an EEPROM type memory storage component associated with a sensor test sample and integral to a second sensor manufactured from the same material lot in accordance with an aspect of the present invention.

FIG. 10 illustrates a spread sheet of exemplary parameters 1000 associated with a drift function of a characterized sensor. The parameters 1000 comprise fitted data coefficients of thermocouple measurement data representing a function of time and drift at a predetermined temperature, having a form similar to that of equation 1010. The exemplary data is divided into three segments T1, T2 and T3, each using, for example, the drift equation 1010 having data coefficients C0–C2 covering a time segment $t_{LOW}$ to $t_{HIGH}$. The fitted data coefficient parameters 1000 may be derived from, for example, the two dimensional data 900 tabulated in FIG. 9. Such parameters (e.g., values, data coefficients, data measurements, functions) may be stored in a memory storage component of a sensor system and later used in a sensor drift compensation system in accordance with an aspect of the present invention for compensating for the drift in the measurements of a sensor.

Figure 11:
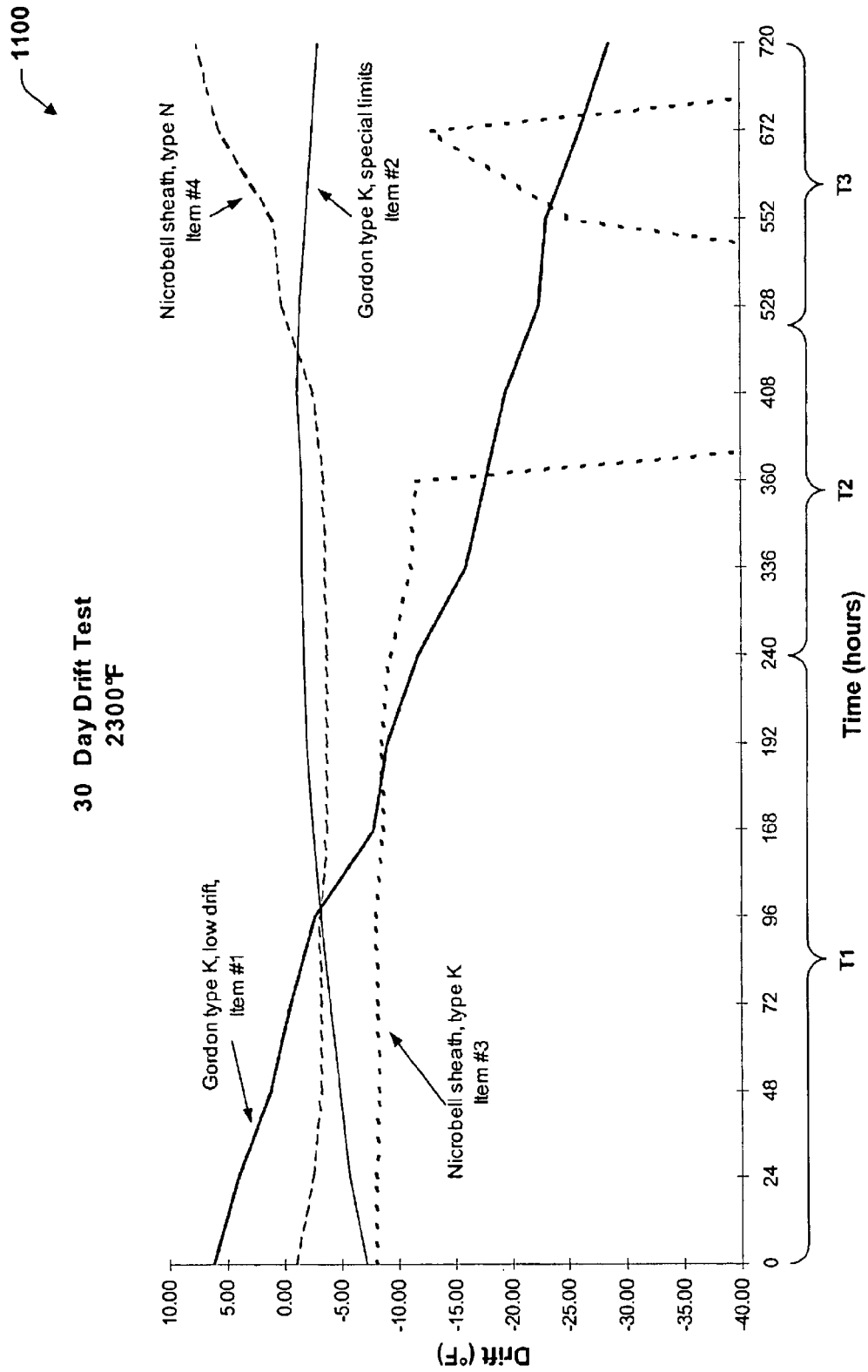
FIG. 11 is a plot illustrating the drift over time of several exemplary thermocouple types and materials for temperature monitoring systems.

FIG. 11 illustrates a graph 1100 plotting the drift over time of several exemplary thermocouple types and materials for a temperature monitoring systems. For example, the drift plot of the Item #1, Gordon type K, low drift thermocouple material further graphically illustrates the data 900 tabulated in FIG. 9 and the fitted data coefficients 1000 of FIG. 10 that has been divided into three time segments T1, T2, and T3. The drift plots of FIG. 11 cover 5 types of thermocouples and materials thermally monitored for 30 days at a temperature of 2300° F. The drift plots also demonstrate the need for characterizing and for compensating the drift as a function of time and/or temperature. A multinomial comprising piecewise polynomial functions (e.g., FIG. 10) may be useful particularly when characterizing a wild, or somewhat discontinuous drift plot (e.g., the Item #3, Nicrobell sheath, type K thermocouple plot of FIG. 11 beyond about the 360 hour time).

Although three time segments have been used to describe the drift characteristics and parameters of the exemplary sensor drift data, any number of segments and parameters as well as any mathematical expressions, data tables, or algorithms may be used to describe a sample test sensor and a second sensor associated with or manufactured from the same material lot, and are contemplated in the context of the present invention.

Figure 12:
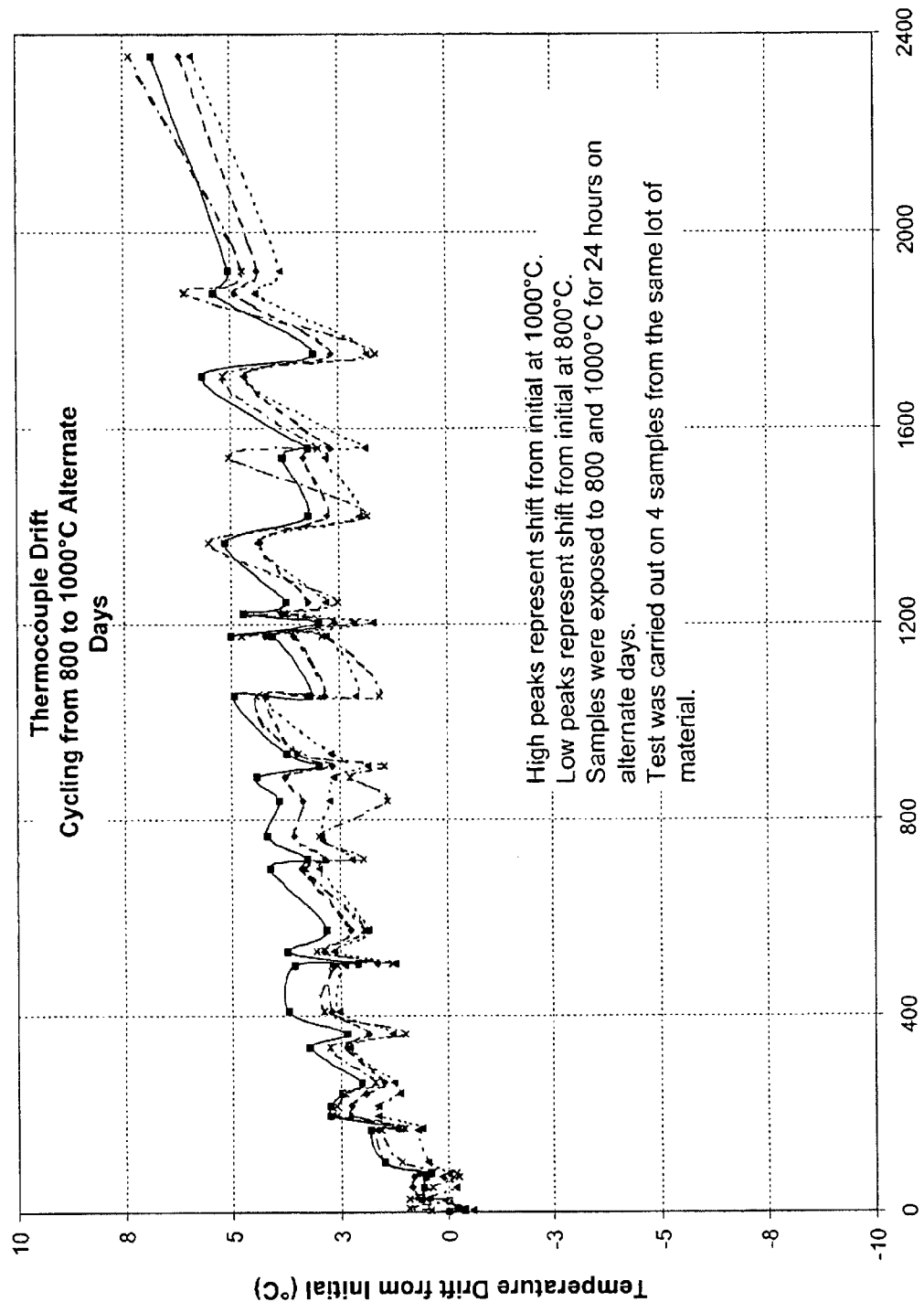
FIG. 12 is a plot illustrating the differing drift rates over time at differing temperatures of several exemplary thermocouple types and materials for temperature monitoring systems.

FIG. 12 illustrates the variance in drift rates due to different application conditions. The graph of FIG. 12 shows a series of alternate local minimum and maximum temperatures corresponding to drift readings at 800 and 1000° C., respectively. In each case the sensors were exposed to the corresponding temperature for 24 hours and then exposed to the other temperature for the next cycle. The 800° C. drift rate could be approximated by a value of 2E-3° C./hour over the 2400 hour test or could be divided into subregions for a more precise drift compensation function over smaller intervals. The 1000° C. likewise could be approximated with a 3E-3° C./hour drift rate, which is slightly higher than the 800° C. rate.

Thus, whether drift is caused by exposure to a single fixed temperature and time environment, or multiple temperatures for multiple times, the drift function may be characterized and compensated in accordance with the drift compensation system and method of the present invention.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such a feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising."

What is claimed is:

1. A drift compensation system for compensating the drift of a sensor within a manufacturing lot, comprising:

a sensor test sample manufactured from a lot of material having substantially similar chemical or metallurgical properties;

a drift characterization tester, wherein the test sample is exposed to a predetermined thermal environment, and wherein measurements of the test sample output are analyzed to provide a functional relationship between temperature and time associated with the sensor test sample;

a drift function describing the relationship between time and temperature derived from the thermal exposure testing of the test sample in the drift characterization tester;

a sensor system comprising:
  a second sensor manufactured from the same lot of material as the sensor test sample; and
  a memory storage component for storing parameters associated with the drift function of the sensor test sample and the second sensor;

a drift compensation instrument coupleable to the second sensor, and operable to retrieve the stored parameters of the drift function from the memory storage component and correct the output of the second sensor based on the drift function; and wherein the sensor test sample is exposed to the predetermined thermal environment in the drift characterization tester to characterize the drift function that is used by the drift compensation instrument to compensate the output drift of the sensors manufactured from the same lot of material.

2. The drift compensation system of claim 1, further comprising an expected thermal exposure input for the sensor lot, comprising an estimated temperature and time of thermal exposure of the sensor lot.

3. The drift compensation system of claim 1, wherein the thermal exposure comprises a predetermined temperature for a predetermined time.

4. The drift compensation system of claim 1, wherein the test sample and second sensors are thermocouples.

5. The drift compensation system of claim 1, wherein the test sample and second sensors comprise one of a resistance temperature detector, a thermistor, a diode, and a transistor.

6. The drift compensation system of claim 1, wherein the test sample and second sensors comprise one of a pressure sensor, a humidity sensor, a chemical sensor, and a flow sensor.

7. The drift compensation system of claim 1, wherein the memory storage component of the sensor system comprises one of an EPROM, an EEPROM, a barcode, an RFID tag, a virtual storage location on a network, a memory device, a computer readable medium, and a computer disk.

8. The drift compensation system of claim 1, wherein the drift characterization tester, comprises:
  a sensor test sample to be characterized;
  a thermal test chamber for exposing the test sample to a predetermined temperature for a predetermined time;
  a measuring component for reading the output of the test sample as a function of temperature and time;
  a drift analyzer having a local memory storage capability for storage of sensor output data as a function of temperature and time, operable to analyze the data and characterize a drift function, and having a drift macro operable to determine a set of drift function parameters associated with the drift function; and
  wherein the drift characterization tester is operable to output to a memory storage component associated with a second sensor the parameters associated with the drift function from the characterization of the sensor test sample.

9. The drift compensation system of claim 1, wherein the drift compensation instrument comprises:
  an input portion coupleable to the memory storage component, and operable to retrieve the stored parameters of the drift function from the memory storage component;
  a measurement portion coupleable to the second sensor for measuring the present output of the sensor before compensation for drift and providing measurement data to a processor portion;
  the processor portion operable to use the parameters associated with the drift function and the present output of the sensor, and correct the output measurements of the second sensor based on the parameters;
  a local memory portion for storing present measurements, the parameters and other values necessary for compensating the sensor measurements associated with drift;
  an output portion for supplying the compensated output of the sensor to an external device; and
  wherein coupleable to the second sensor, and operable to retrieve the stored parameters of the drift function from the memory storage component and correct the present output of the second sensor based on the drift function.

10. The drift compensation system of claim 1, wherein the thermal exposure comprises a plurality of predetermined temperatures over a predetermined period of time.

11. The drift compensation system of claim 1, wherein the compensation for the drift comprises a correction to one of an indicated temperature value with respect to drift.

12. A measurement system for compensating the drift of a sensor within a manufactured lot of sensors, comprising:
  a sensor test sample manufactured from a lot of material having substantially similar chemical or metallurgical properties;
  an expected thermal exposure input for the sensor lot, comprising an exposure to an expected temperature and time;
  a drift characterization tester, wherein the test sample is exposed to the expected temperature for the expected time;
  a drift function describing the relationship between time and temperature derived from the thermal exposure testing of the test sample;
  a memory storage component for storing parameters corresponding to the drift of the sensor test sample and a second sensor manufactured from the same lot of material;
  a drift compensation instrument coupleable to the second sensor of the sensor lot, and operable to retrieve the stored parameters of the drift function from the memory storage component and correct the output of the second sensor based on the drift function; and
  wherein the sensor test sample is exposed to the expected thermal environment in the drift characterization tester to characterize the drift function that is used by the drift compensation instrument to compensate the output drift of the second sensor manufactured from the same lot of material.

13. The measurement system of claim 12, further comprising an expected thermal exposure input for the sensor lot, comprising an estimated temperature and time of thermal exposure of the sensor lot.

14. The measurement system of claim 12, wherein the expected thermal exposure comprises a predetermined temperature for a predetermined time.

15. The measurement system of claim 12, wherein the thermal exposure comprises a plurality of predetermined temperatures for one of a plurality of predetermined times.

16. The measurement system of claim 12, wherein the test sample and second sensor are thermocouples.

17. The measurement system of claim 12, wherein the test sample and second sensor comprise one of a resistance temperature detector, a thermistor, a diode, and a transistor.

18. The measurement system of claim 12, wherein the test sample and second sensor comprise one of a pressure sensor, a humidity sensor, a chemical sensor, and a flow sensor.

19. The measurement system of claim 12, wherein the memory storage component of the sensor system comprises one of an EPROM, an EEPROM, a barcode, an RFID tag, a virtual storage location on a network, a memory device, a computer readable medium, and a computer disk.

20. The measurement system of claim 12, wherein the drift characterization tester, comprises:

a sensor test sample to be characterized;

a thermal test chamber for exposing the test sample to a predetermined temperature for a predetermined time;

a measuring component for reading the output of the test sample as a function of temperature and time;

a drift analyzer having a local memory storage capability for storage of sensor output data as a function of temperature and time, operable to analyze the data and characterize a drift function, and having a drift macro operable to determine a set of drift function parameters associated with the drift function; and wherein the drift characterization tester is operable to output to a memory storage component associated with a second sensor the parameters associated with the drift function from the characterization of the sensor test sample.

21. The measurement system of claim 12, wherein the drift compensation instrument comprises:

an input portion coupleable to the memory storage component, and operable to retrieve the stored parameters of the drift function from the memory storage component;

a measurement portion coupleable to the second sensor for measuring the present output of the sensor before compensation for drift and providing measurement data to a processor portion;

the processor portion operable to use the parameters associated with the drift function and the present output of the sensor, and correct the output measurements of the second sensor based on the parameters;

a local memory portion for storing present measurements, the parameters and other values necessary for compensating the sensor measurements associated with drift;

an output portion for supplying the compensated output of the sensor to an external device; and wherein coupleable to the second sensor, and operable to retrieve the stored parameters of the drift function from the memory storage component and correct the present output of the second sensor based on the drift function.

22. A method of compensating for the drift of a sensor in a measurement system comprising a sensor test sample manufactured from a lot of material having substantially similar chemical or metallurgical properties, a drift characterization tester, a drift function, a sensor system comprising a second sensor manufactured from the same lot of material as the sensor test sample, and a memory storage component, and a drift compensation instrument, the method comprising:

exposing a sensor test sample to a predetermined thermal environment in the drift characterization tester;

measuring the output of the sensor as a function of temperature and time;

characterizing and storing a drift function for the sensor, wherein the drift function describes the relationship between time and temperature derived from the thermal exposure temperature and time measurements of the test sample;

storing parameters associated with the drift function in the memory storage component of the sensor system;

inputting the parameters associated with the drift function to the drift compensation instrument, and use the parameters to compensate the output drift of the second sensor; and wherein the sensor test sample is exposed to the predetermined thermal environment in the drift characterization tester to characterize the drift function used by the drift compensation instrument to compensate the output drift of the second sensor manufactured from the same lot of material.

23. The drift compensation method of claim 22, wherein the parameters associated with the drift function are used for constructing a drift compensation function operable to compensate the output drift of the second sensor.

24. The drift compensation method of claim 23, wherein the parameters associated with the drift function are fitted data coefficients of a math function.

25. The drift compensation method of claim 23, wherein the parameters associated with the drift function are a two dimensional matrix of the measurement data from the sensor test sample characterization.

26. The drift compensation method of claim 23, wherein the parameters associated with the drift function are fitted data coefficients of a plurality of math functions associated with a plurality of segments of the drift function.

27. The drift compensation method of claim 22, wherein the characterizing and storing a drift function for the sensor comprises analyzing the measurement outputs of the test sample and deriving a drift function based on the relationship of the temperature and time associated with the drift of the test sample, and storing parameters associated with the drift function.

28. The drift compensation method of claim 22, wherein the test sample and second sensors comprise one of a resistance temperature detector, a thermistor, a diode, and a transistor.

29. The drift compensation method of claim 22, wherein the test sample and second sensors comprise one of a pressure sensor, a humidity sensor, a chemical sensor, and a flow sensor.

30. The drift compensation method of claim 22, wherein the memory storage component of the sensor system comprises one of an EPROM, an EEPROM, a barcode, an RFID tag, a virtual storage location on a network, a memory device, a computer readable medium, and a computer disk.

* * * * *